United States Patent [19]

Fukaya

[11] Patent Number: 5,142,942
[45] Date of Patent: Sep. 1, 1992

[54] CONICAL FRICTIONAL DIFFERENTIAL DRIVE STEERING MECHANISM

[75] Inventor: Hiroshi Fukaya, Fujimi, Japan

[73] Assignee: Hanix Kogyo Kabushiki Kaisha, Tokyo, Japan

[21] Appl. No.: 762,119

[22] Filed: Sep. 19, 1991

[30] Foreign Application Priority Data

Sep. 19, 1990 [JP]  Japan .................................. 2-249661

[51] Int. Cl.$^5$ ............................................ B62D 11/02
[52] U.S. Cl. ..................................... 74/650; 74/721; 74/191; 180/6.2
[58] Field of Search ............ 74/191, 193, 650, 665 F, 74/665 G, 665 GB, 665 GC, 721; 180/6.2, 6.26, 6.66, 6.64

[56] References Cited

U.S. PATENT DOCUMENTS

| | | | |
|---|---|---|---|
| 1,124,951 | 1/1915 | Remy et al. ............................ | 74/721 |
| 1,170,877 | 2/1916 | Colwell et al. ......................... | 74/721 |
| 1,218,666 | 3/1917 | Johnson .................................. | 74/721 |
| 1,225,190 | 5/1917 | Sparling ................................. | 74/721 |
| 2,057,482 | 10/1936 | Erban ..................................... | 74/721 |
| 3,303,722 | 2/1967 | Boggs .................................... | 74/650 |
| 3,343,621 | 9/1967 | Doorne .................................. | 180/6.2 |
| 3,448,818 | 6/1969 | Davis ..................................... | 74/721 |
| 4,293,050 | 10/1981 | Goloff et al. ........................... | 74/721 X |
| 4,296,647 | 10/1981 | Kemper ................................. | 74/191 X |
| 4,875,535 | 10/1989 | Parker ................................... | 180/6.2 |

FOREIGN PATENT DOCUMENTS 802303  7/1949  Fed. Rep. of Germany ........ 74/721
647443  11/1928  France ............................... 180/6.26

Primary Examiner—Richard Lorence
Assistant Examiner—Khoi Q. Ta
Attorney, Agent, or Firm—Browdy and Neimark

[57] ABSTRACT

A differential device has a drive shaft, a pair of cones connected to it so as to rotate at the same speed, a pair of wheel shafts with a pair of ring wheels fitted on them such that the ring wheels are engaged in a rotational direction with conical surfaces of the cones. The ring wheels are slidable in an axial direction and are positioned parallel to the axis of the corresponding wheel shafts. The ring wheels are transmissively in contact with the outer conical surfaces of the pair of cones. A steering mechanism is included for moving these ring wheels axially on the wheel shafts proportional to the amount of steering. A pair of brake teeth are on the ring wheels and a corresponding pair of brake teeth are attached to a fixed casing. When one of the ring wheels moves toward a smaller-diameter side of the corresponding cone, and gets off of the corresponding conical surface, the other ring wheel keeps making transmissive contact with a larger diameter of the other cone corresponding to the other ring wheel. Also when one of the ring wheels gets off the conical surface, the brake teeth of that ring wheel can mesh with the corresponding fixed brake teeth while the other ring wheel keeps making transmissive contact with a larger-diameter of the other cone corresponding to the other ring wheel.

1 Claim, 3 Drawing Sheets

FIG. 1
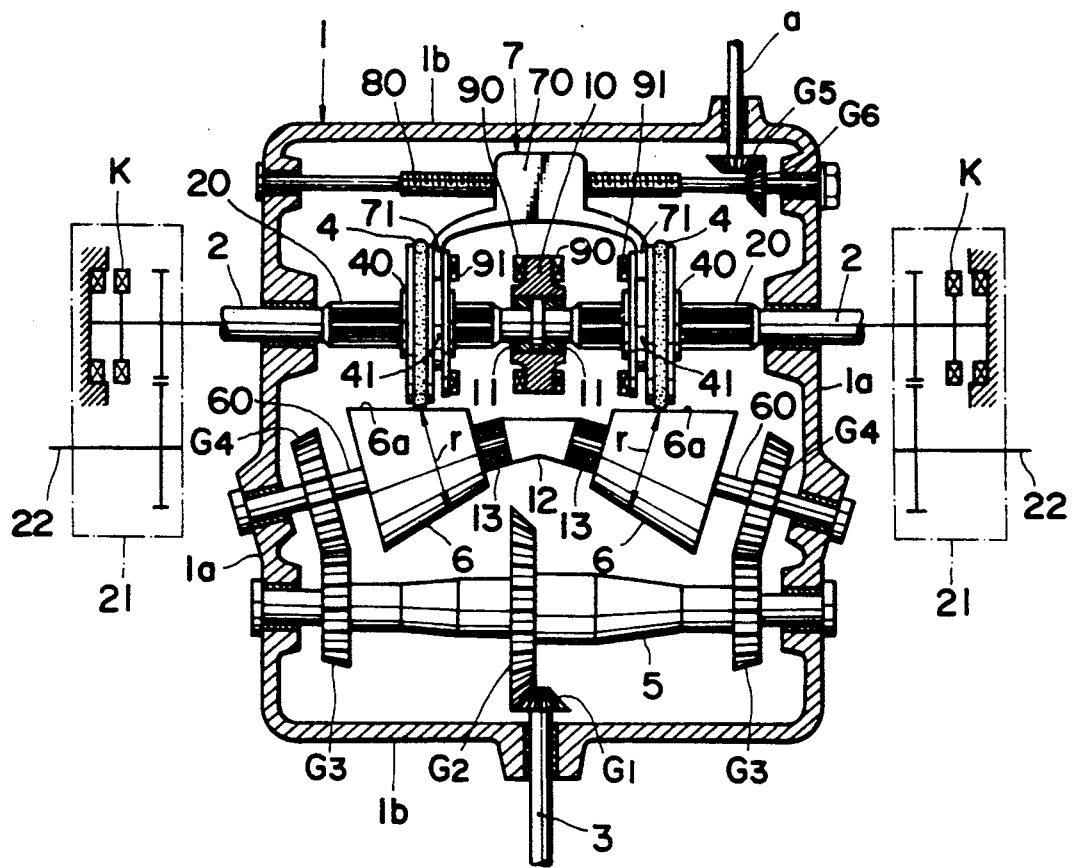
FIG. 4
FIG. 2
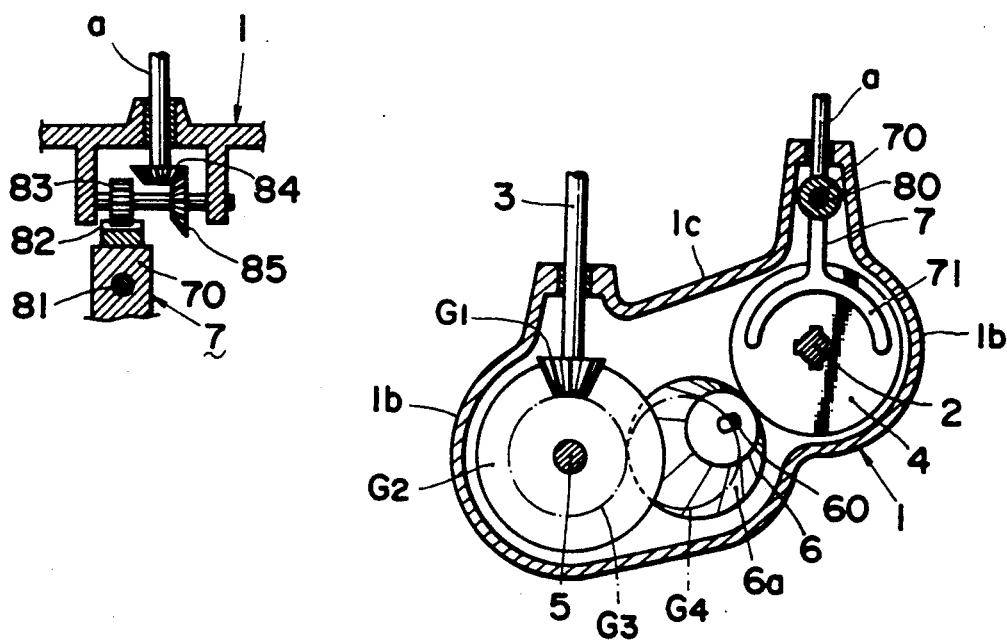

CONICAL FRICTIONAL DIFFERENTIAL DRIVE STEERING MECHANISM

FIELD OF THE INVENTION

This invention relates to a differential device for forcibly driving the respective wheel shafts of left and right drive wheels provided on the left and right sides of a vehicle body with the differential ratio of angular velocities corresponding to a steering operation.

BACKGROUND OF THE INVENTION

A conventional differential device known as a differential gear is so composed that the respective wheel shafts of left and right drive wheels are differentially rotated by the arrangement of gears forming a planetary gear so as to equalize the arithmetic mean of the sum of angular velocity of the wheel shaft of the drive wheel at one side and that of the wheel shaft of the drive wheel at the other side or the difference therebetween.

Such a conventional differential device performs the differential operation in angular velocities of the respective wheel shafts of the left and right drive wheels, since a difference between the resistances applied to the left and right wheels is caused by the deviation of a steering wheel due to its steering operation. Therefore, such a conventional differential device is manufactured to be adapted to a wheel type vehicle having a steering wheel, while it is difficult to be adapted to a crawler type vehicle having no steering wheel. Further, the differential operation of the angular velocities of the left and right wheel shafts is performed by the difference between the travel resistance applied to the left drive wheel and that applied to the right drive wheel. Thus, if one of the left and right drive wheels falls into a muddy place free from resistance, for instance, only the drive wheel losing the resistance rotatably slips in its spot, and the other drive wheel having the resistance does not rotate to thereby make the travel of a vehicle impossible.

The crawler type vehicle having no steering wheel is controllably steered by driving the respective wheel shafts of the left and right crawlers by individual hydraulic motors, and controlling the operation of the hydraulic motors by the operation of a control lever to change the rotational speed of the left and right crawlers. For this reason, the vehicle of crawler type is inferior to the vehicle of wheel type in smoothness of the steering operation and the controllability.

SUMMARY OF THE INVENTION

Accordingly, it is desired to develop a differential device, which is capable of being adapted to the crawler type vehicle having no steering wheel, and prevents the incapability of travelling due to the slip of one of the left and right drive wheels, even if one of the drive wheel falls into a muddy place free from the travel resistance.

The present invention is provided in order to meet such requirement as noted above and its object is to provide a new differential device which is capable of forcibly driving left and right drive wheels with the differential ratio of angular velocities corresponding to the steering operation, irrespective of the travel resistances of these drive wheels, to thereby prevent the incapability of travelling due to the slip of one of the drive wheels falling in a place having no travel resistance, and which is capable of being adapted to a vehicle of crawler type having no steering wheel to permit the pivot-turn by stopping the rotation of one of the left and right drive wheels, while driving only the other drive wheel, in case of being adapted to the vehicle of crawler type.

BRIEF DESCRIPTION OF THE INVENTION

FIG. 1 is a cross-sectional view showing a differential device in its developed state as a preferred embodiment according to the present invention;

FIG. 2 is a longitudinal sectional side view showing a difference device as another preferred embodiment;

FIG. 4 is a longitudinal sectional side view showing an essential part of the above embodiment.

DETAILED DESCRIPTION OF THE EMBODIMENT

Figure 3:
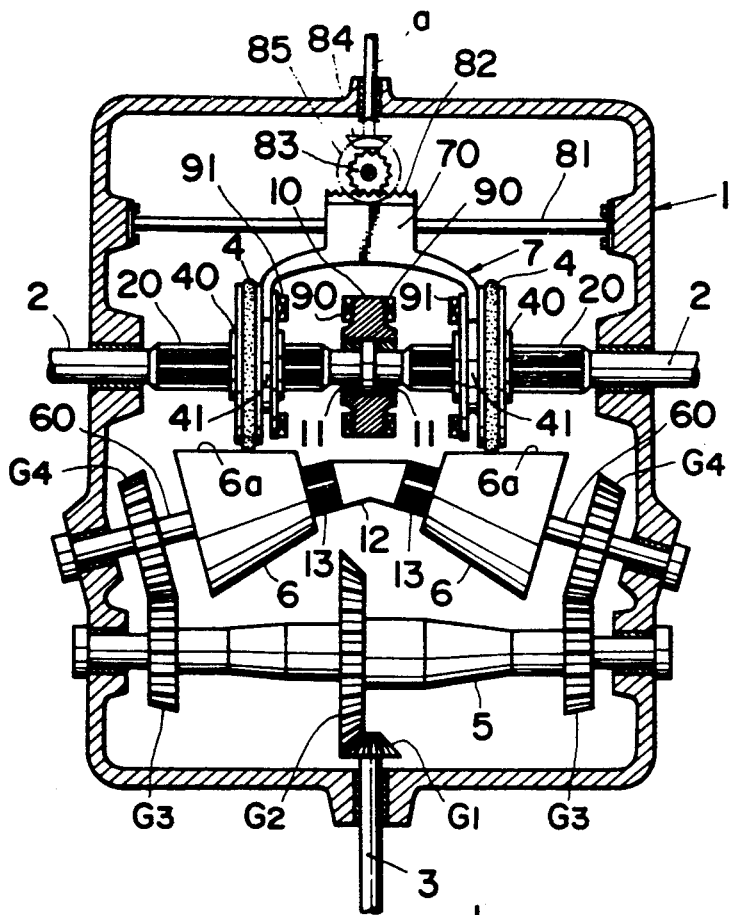
FIG. 3 is a cross-sectional view showing a differential device in its developed state as a further preferred embodiment.

The preferred embodiments of the invention will be described with reference to the accompanying drawings.

Referring to FIG. 1, reference numeral 1 designates a casing of a differential mechanism formed into a substantially square box-like shape, 2 left and right wheel shafts, 3 a drive shaft connected to an output shaft of an engine, 4 ring wheels respectively supported on the left and right wheel shafts 2 and 2, 5 an intermediate shafts, 6 cones, and reference symbol a designates a steering mechanism.

The wheel shafts 2 are respectively journalled by left and right casing walls 1a of the casing 1 with their axes aligned with each other. The respective inside ends of the wheel shafts 2 projecting into the casing 1 are rotatably mounted on a bearing support metal member 10 of the casing 1 through bearing 11. The wheel shafts 2 are respectively formed with axial splines 20 on their peripheral surface surrounded by the inner surfaces of the casing 1 between the support member 10 and the left and right casing walls 1a.

The ring wheels 4 are respectively fitted on the wheel shafts 2 such that these ring wheels 4 are brought into engagement with the wheel shafts 2 in the rotational direction as being axially slidable on the wheel shafts 2 by fitting the splines 20 in other splines (not shown) provided on the inner peripheral surfaces of boss portions 40 of the ring wheels 4. The inside faces of the ring wheels 4 facing the support member 10 are respectively provided with brake teeth 91 meshing with brake teeth 90 respectively provided on the left and right side faces of the support member 10. The outside ends of the wheel shafts 2 projecting from the casing 1 are respectively connected to final wheel shafts 22 through transmission gear mechanism 21 including parking brakes K.

A lower end of the drive shaft 3 is connected to an output shaft of the engine (not shown), and an upper side of the drive shaft 3 is journalled by a lower wall 1b of the casing 1. A bevel gear G1 is fitted on the upper end of the drive shaft 3.

The intermediate shaft 5 is disposed between the upper end of the drive shaft 3 and rotatably mounted on the casing 1. A bevel gear G2 meshing with the bevel gear G1 is fixed on the center portion of the intermediate shaft 5. A pair of transmission gears G3 are fixed on left and right end portions of the intermediate shaft 5 respectively.

The cones 6 are disposed symmetrically left and right between the intermediate shaft 5 and the left and right wheel shaft 2 in such manner that small-diameter sides of the cones 6 are opposed to each other. The cones 6 are respectively fixed on rotary shafts 60. The shafts 60 are rotatably mounted on the casing 1 through a bearing 13 of a bearing support metal member 12 provided integrally in the casing 1 and another bearing of the left and right walls 1a.

The cones 6 are synchronously rotated at the same speed with the rotation of the intermediate shaft 5 by respectively meshing a pair of transmission gear G4 provided on the rotary shafts 60 with a pair of transmission gears G3 of the intermediate shaft 5. Conical transmission surfaces 6a of the cones 6 facing the wheel shafts 2 are positioned as being accurately parallel to the axes of the wheel shafts 2. The peripheral surfaces of the ring wheels 4 respectively fitted to the wheel shafts 2 are into contact with the sides of the conical transmission surfaces 6a.

The left and right wheel shafts 2, which are rotated by the rotational power transmitted from the ring wheels 4 respectively disposed in contact with the transmission surfaces 6a of the left and right cones 6, have their angular velocities determined depending on the contact positions of the ring wheels 4 with the transmission surfaces 6a of the left and right cones 6.

A reference numeral 7 designates a shifter for varying the contact positions of the ring wheels 4 with the transmission surfaces 6a of the cones 6 to determine the angular velocities of the left and right wheel shafts 2 according to the operational amount of the steering mechanism a in response to the operation of a steering wheel. The shifter 7 is supported in the casing 1 by a screw shaft 80 by screwing a boss portion 70 of the shifter 7 on the screw shaft 80 so that the shifter 7 is moved in the axial direction of the screw shaft 80 through the rotation of the screw shaft 80. The screw shaft 80 is laterally journalled between the left and right walls 1a of the casing 1 such that the axis of the screw shaft 80 extends parallel to the axes of the left and right wheel shafts 2. A pair of left and right forks 71 respectively formed on bifurcated end portions extending from left and right ends of the boss portion 70 are fittingly into engagement with engaging grooves 41 of the left and right ring wheels 4.

The steering mechanism a for rotating the screw shaft 80 in order to displace the shifter 7 is formed on a rotating steering rod, and is journalled by one (the upper end side in FIG. 1) of the upper wall 1b of the casing 1. This steering mechanism a displaces the shifter 7 left and right by rotating the screw shaft 80 by rotating the steering rod in response to the operation of the steering wheel by meshing a bevel gear G5 provided on an inner end of the steering rod projecting into the casing 1 with a bevel gear G6 provided on one end of the screw shaft 80.

The screw shaft 80 supporting the shifter 7 is an operating mechanism for varying the transmitting contact positions of the ring wheels 4. As long as the operating mechanism displaces the ring wheels 4 according to the operational amount of the steering mechanism a, such an operating mechanism will suffice for the screw shaft 80. As shown in FIGS. 3 and 4, the operating mechanism for displacing the shifter 7 may be changed into another proper operating mechanism, in which the boss portion 70 of the shifter 7 is supported by a guide rod 81 laterally provided in the casing 1 so that the shifter 7 is slidable left and right, a rack 82 extending along the guide member 81 is provided on the upper peripheral surface of the boss portion 70, a pinion 83 meshing the rack 82 is connected with the steering mechanism a through transmission gears 84 and 85, whereby the shifter 7 is directly through the rotation of the steering mechanism a.

Figure 6:
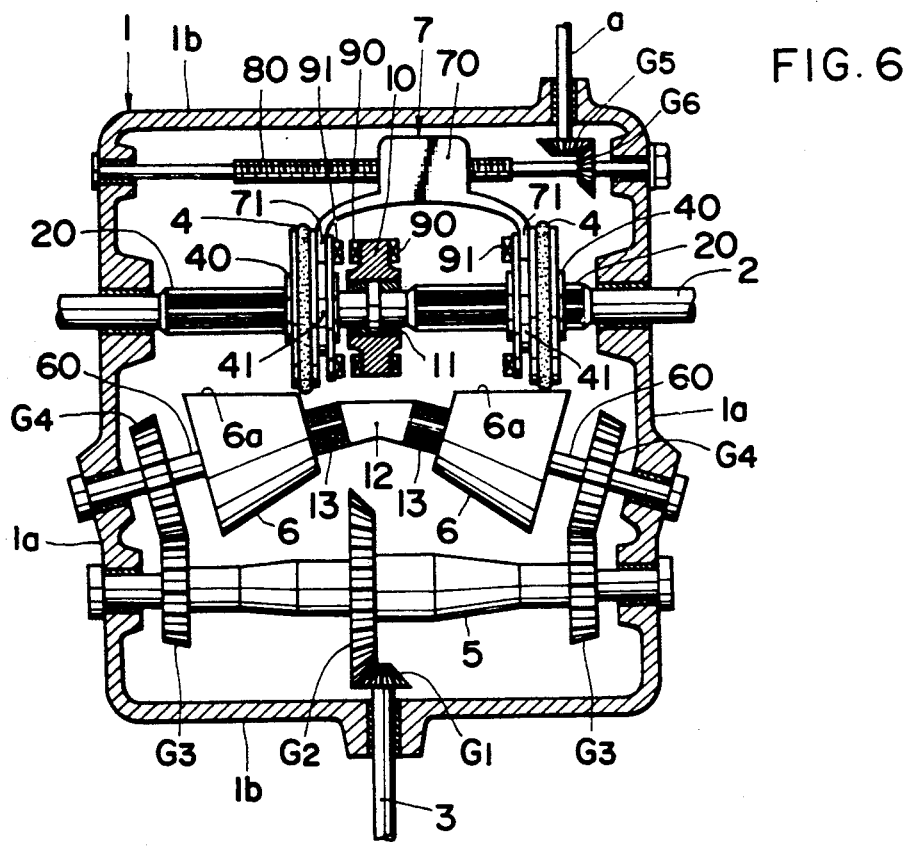
Figure 7:
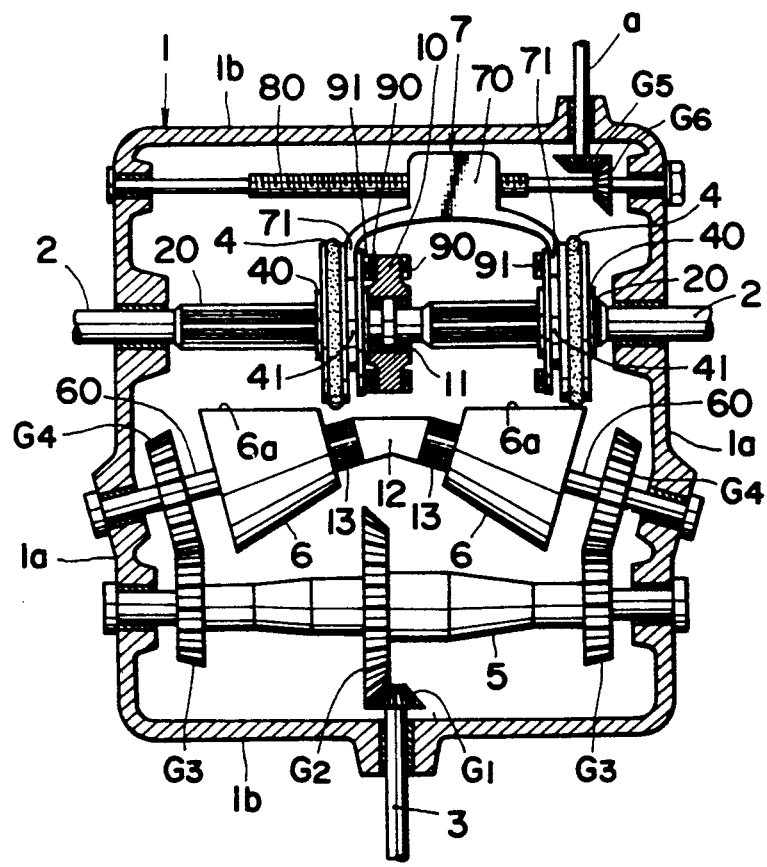

The shifter 7 displaces the ring wheels 4 according to the operational amount of the steering mechanism a in response to the steering operation such that one ring wheel 4 moved toward the smaller effective diameter side of the transmission surface 6a of cone 6 corresponding to one ring wheel 4 to thereby move the other ring wheel 4 toward the larger effective diameter side of the transmission surface 6a of the cone 6 corresponding to the other ring wheel 4. When the one ring wheel 4 gets out of the smallest effective diameter of the corresponding transmission surface 6a, one wheel shaft 2 corresponding to the one ring wheel 4 is not rotated (see FIG. 6). When the one ring wheel 4 is further moved away from the position as shown in FIG. 6, the brake teeth 91 provided on the inner end face of the one ring wheel 4 mesh with the brake teeth 90 provided on the support member 10 and the other ring wheel 4 still contacts with the larger effective diameter of the corresponding cone 6, as shown in FIG. 7.

The gradient of each of the transmission surfaces 6a of the left and right cones 6 for determining the differential ratio of the angular velocities of the left and right wheel shafts 2 and the displacement of the ring wheel 4 by the shifter 7 corresponding to the operational amount of the steering mechanism a are properly set depending on the type and form of a vehicle using the differential device.

The embodiment shown in FIG. 1 is applied to a vehicle, in which an engine is mounted at the rear end side of the vehicle body, and the steering mechanism is provided on the front end side of the vehicle body. In case the vehicle incorporating the differential device has both of the engine and the steering mechanism provided on the front end side of the vehicle body, the steering mechanism a may be journalled by the casing wall 1a, at the side where the drive shaft 3 is journalled, or otherwise, the steering mechanism a may be selectively journalled by the upper side wall 1c or the lower side wall of the casing 1 in parallel to the drive shaft 3, as shown in FIG. 2.

The differential device as the preferred embodiment of the present invention is operated as follows:

When the steering device is under the straight travel condition, and the steering mechanism a is in the neutral position, the shifter 7 is held such that a pair of left and right ring wheels 4 come into contact with the transmission surfaces 6a on their positions equal to each other in effective diameter of r, as shown in FIG. 1. Therefore, the ring wheels 4 rotating in contact with the transmission surfaces 6a are rotated at the same speed, and the left and right wheel shafts 2 receiving the rotational power transmitted from the ring wheels 4 through the splines 20 are rotated at the equal angular velocity.

Figure 5:
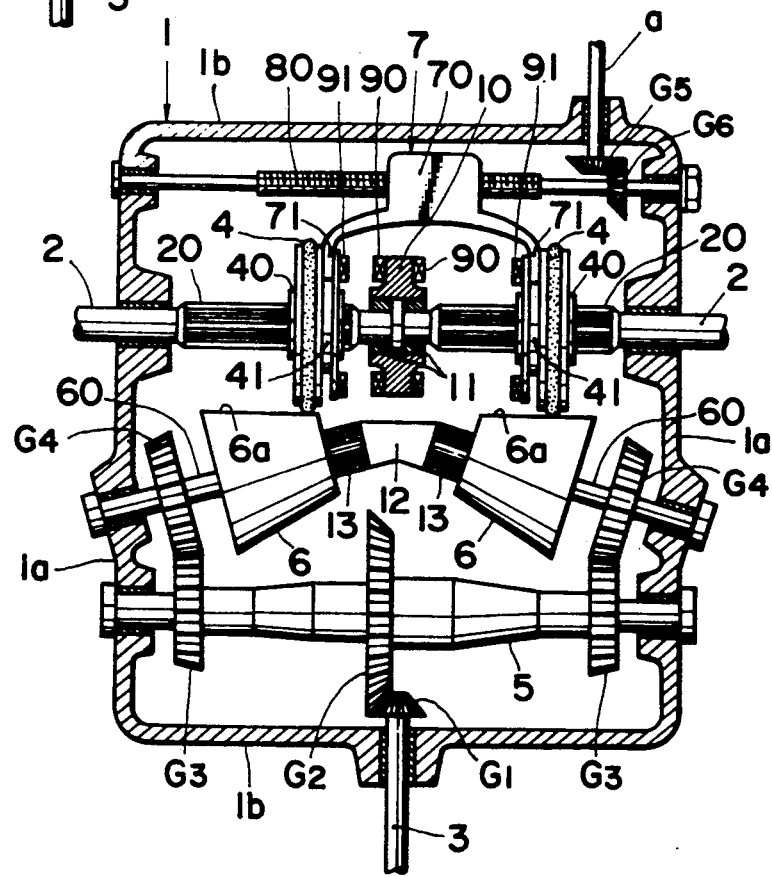
FIGS. 5 through 7 are views for explaining the operation of the embodiment shown in FIG. 1.

When the shifter 7 is moved rightward in FIG. 1 by operating the steering mechanism a so as to turn the vehicle body leftward, the left and right ring wheels 4 are thereby respectively moved rightward relative to the cones 6, as shown in FIG. 5. In this state, the left ring wheel 4 fitted on the left wheel shaft 2 is rotated at the reduced speed corresponding to the reduction of the effective diameter of the cone 6. Also, the right ring wheel 4 fitted on the right wheel shaft 2 is rotated at the increased speed corresponding to the expansion of the effective diameter of the cone 6. Therefore, the vehicle body is made to turn leftward. The slow-down of the left wheel shaft 2 and the speed-up of the right wheel shaft 2 are performed in proportion to the displacement of the ring wheels 4 by the shifter 7 so as to equalize to arithmetic mean of the sum of the slow-down and the speed-up or the difference therebetween, since the left and right cones 6 takes the same shape and are disposed as being symmetrical left and right.

Accordingly, the left and right wheel shafts 2 are capable of being forcibly driven at the angular velocities corresponding to the operational amount of the steering mechanism a. Therefore, even if one drive wheel falls into a place having no travel resistance, a phenomenon, in which one drive wheel idles and the other drive wheel does not rotate, is prevented. Further, by applying the device of the present invention to a vehicle of crawler type having no steering wheel, the vehicle of crawler type is controllably steered with the same feeling as that of the steering operation of a vehicle of usual wheel type.

When the displacement of the ring wheels 4 is enlarged by the operation of the steering mechanism, and one ring wheel 4 gets out of the corresponding transmission surface 6a, as shown in FIG. 6, the transmission of rotational power to the wheel shaft 2 controlled by the one ring wheel 4 is shut off, while only the wheel shaft 2 controlled by the other ring wheel 4 is driven with the transmission ratio corresponding to the effective diameter of the cone 6 positioned so as to be transmissively in contact with the other ring wheel 4. Therefore, the vehicle body is made to quickly turn.

Next, when the steering mechanism a is further operated from such a condition, and the brake teeth 91 provided on the inner end face of the one ring wheel 4 mesh with the clutch teeth 90 provided on the casing 1, as shown in FIG. 7, the rotation of the wheel shaft 2 controlled by the one ring wheel 4 is locked, while only the outer wheel shaft 2 is forcibly driven through the transmissive contact of the other ring wheel 4 with the other cone 6. Therefore, the vehicle body performs the operation of pivot turn in its spot.

What is claimed is:

1. A differential device comprising,
   a drive shaft pivotably mounted on a casing and connected to an engine;
   a pair of left and right cones having the same shape and said cones being connected to said drive shaft so as to rotate at the same speed;
   a pair of left and right wheel shafts pivotably mounted on said casing as rotating individually;
   conical transmission surfaces of said left and right cones each accurately positioned in parallel to an axis of the corresponding wheel shafts;
   a pair of left and right ring wheels having the same diameter and being fitted on said left and right wheel shafts respectively such that said ring wheels are engaged in a rotational direction and being slidable in an axial direction, and said ring wheels transmissively make contact with outer conical surfaces of said left and right cones respectively;
   a steering mechanism for moving said ring wheels axially of said wheel shafts in synchronism with an operational amount of said steering mechanism;
   a pair of first brake teeth provided on said ring wheels respectively, and a pair of second brake teeth fixedly attached to said casing; and
   wherein when one of said ring wheels moves toward a smaller-diameter side of the corresponding cone, and gets off of the corresponding surface, the other ring wheel keeps making transmissive contact with a larger diameter of the other cone corresponding to the other ring wheel and when the ring wheels moves further said first brake teeth of one ring wheel contacts the corresponding second brake teeth fixedly attached to said casing.

* * * * *